United States Patent [19]
Mathey et al.

[11] Patent Number: 6,086,154
[45] Date of Patent: Jul. 11, 2000

[54] INFINITELY ADJUSTABLE SEAT TRACK ASSEMBLY

[75] Inventors: Tom O. Mathey, Rockton, Ill.; Michael D. Kobrehel, Elkhart; Christopher George Pasternak, Mishawaka, both of Ind.

[73] Assignee: Dura Automotive Systems, Inc., Rochester Hills, Mich.

[21] Appl. No.: 09/052,212

[22] Filed: Mar. 31, 1998

[51] Int. Cl.[7] .................................................. F16M 13/00
[52] U.S. Cl. .......................................... 297/341; 248/429
[58] Field of Search .................................. 297/341, 340, 297/378.1, 344.1; 248/424, 429, 430

[56] References Cited

U.S. PATENT DOCUMENTS

| | | | |
|---|---|---|---|
| 3,866,876 | 2/1975 | Adams | 248/429 |
| 3,874,480 | 4/1975 | Porter et al. | 188/67 |
| 4,880,084 | 11/1989 | Tanaka et al. | 188/67 |
| 4,964,608 | 10/1990 | Rogala et al. | 248/429 |
| 5,076,530 | 12/1991 | Dove et al. | 248/430 |
| 5,157,826 | 10/1992 | Porter et al. | 29/439 |
| 5,217,195 | 6/1993 | Tanaka et al. | 248/396 |
| 5,219,045 | 6/1993 | Porter et al. | 188/67 |
| 5,286,076 | 2/1994 | DeVoss et al. | 248/429 X |
| 5,348,373 | 9/1994 | Stiennon | 248/424 X |
| 5,441,129 | 8/1995 | Porter et al. | 188/67 |
| 5,481,941 | 1/1996 | Premji | 74/531 |
| 5,568,843 | 10/1996 | Porter et al. | 188/67 |
| 5,641,146 | 6/1997 | Hoshihara et al. | 248/430 |
| 5,785,291 | 7/1998 | Chang | 248/430 X |
| 5,785,292 | 7/1998 | Muraishi et al. | 248/429 |
| 5,829,728 | 11/1998 | Hoshihara et al. | 248/429 |

*Primary Examiner*—Peter M. Cuomo
*Assistant Examiner*—Stephen Vu
*Attorney, Agent, or Firm*—Banner & Witcoff, Ltd.

[57] ABSTRACT

An infinitely adjustable seat track assembly is provided with a lower track assembly and an upper track assembly releasably slidable on the lower track assembly. The lower track assembly comprises at least one lower track, and a wrap spring wrapped around a rod and aligned with the lower track. The upper track assembly has at least one upper track which can slide in forward and rearward directions over the lower track. A lever is mounted on the upper track assembly. The lever is pivotable from a latching position where the wrap spring wraps tightly around the rod, to an unlatching position where the lever urges the wrap spring to partially unwrap around the rod, thereby permitting the wrap spring to slide along the rod. An engagement mechanism operatively engages the wrap spring so that when the lever is in the latching position the upper track is secured to the lower track, and when the lever is in the unlatching position the wrap spring travels with the upper track over the rod in response to the upper track sliding over the lower track. Preferably the rod is secured to the lower track and the wrap spring is free of the upper and lower tracks. An easy entry feature can be attached to the lever so that dumping a seat back to a full down position moves the lever to the unlatching position, allowing the upper track or track to be slid to a full forward position.

19 Claims, 3 Drawing Sheets

INFINITELY ADJUSTABLE SEAT TRACK ASSEMBLY

FIELD OF THE INVENTION

The present invention relates generally to an improved seat track assembly having an "infinite adjustment" feature which allows a seat to be moved to any position along a given travel range.

BACKGROUND OF THE INVENTION

Seat track assemblies are commonly used for forward and rearward comfort adjustment of seats, particularly seats affixed to motor vehicles. Such seats normally have a seat base and a seat back, with the seat back pivotally connected to the seat base by recliners. It is desirable for such seats, especially those positioned in the front row of a motor vehicle, to have upper seat tracks which are slidable over lower seat tracks, where the tracks are releasably secured together by a latch assembly at a position selected by an operator. To enhance stability, typically two pair of tracks are used, each pair positioned generally near one side of the seat base.

Known latch assemblies include a latch member pivotally mounted on the upper track and provided with a series of windows. The windows engage teeth which are typically either cut out of the lower track or positioned on a plate attached to the lower track. Other designs place the latch teeth on the latch and place the windows on a part which is engaged by the latch. A lever is normally attached to a handle or towel bar. Actuation of the towel bar urges the latch windows out of engagement with the teeth, permitting comfort adjustment by allowing the upper track to slide with respect to the lower track. Release of the towel bar allows the latch to resecure the seat tracks together.

Such known designs for securing upper tracks to lower tracks can have several problems. Seat track positioning is ordinarily not "infinite". That is, the incremental amount of adjustment is restricted by the spacing and size of the teeth. Further, due to tolerance stack ups and other minor errors in design tracks on one side of the seat may be slightly misaligned with tracks on the other side of the seat so that the latch windows engage the teeth on one side but do not completely engage the latch teeth on the other side. In addition, when the seat track assembly is subjected to vibrational loading, as in a motor vehicle, the teeth may vibrate against the windows, producing undesirable noise.

One design showing an infinitely adjustable seat track mechanism is shown in U.S. Pat. No. 5,481,941 to Premji. Premji relies on a spring loaded pawl block extending from the lower track to releasably bias a striated roller towards one downward flange of an upper track, and thereby releasably secure the upper track with respect to the lower track. However, this design is complex, as the block requires a framework to slide in, is relatively expensive to manufacture, and is somewhat bulky, taking up valuable space below the seat base.

In view of the foregoing, it is an object of the present invention to provide a seat track assembly having both reduced cost and enhanced manufacturability. It is another, related object of the present invention to provide such a seat track assembly with infinite adjustment and reduced chucking and rattling problems. It is a further object of the present invention to provide a seat track assembly that is highly reliable in operation.

SUMMARY

In accordance with these and other objects, there is provided a seat assembly having a seat base and a seat back pivotably mounted on the seat base. A seat track assembly is affixed to the seat base and comprises a fixed lower track assembly having at least one lower track and an upper track assembly having at least one upper track slidable in forward and rearward directions over the corresponding lower track. A rod may be affixed to the lower track and a wrap spring positioned around the rod. The wrap spring is movable between a binding condition where the wrap spring wraps tightly around the rod and an adjustment condition where the wrap spring is partially unwrapped around the rod. When the wrap spring is in the binding condition engagement flanges cooperate with the wrap spring to restrict forward and rearward movement of the upper track over the lower track. When the spring is at least partially unwrapped around the rod, the engagement flanges urge the wrap spring to slide over the rod in response to sliding of the upper track over the lower track. A lever, preferably mounted on the upper track assembly, is pivotable into engagement with the wrap spring to urge the wrap spring to partially unwrap around the rod. This frees the upper track to slide with respect to the lower track. That is, as the upper track slides one of the flanges pushes the partially unwrapped wrap spring so that wrap spring slides with the flange along the rod. Advantageously, the preferred embodiment does not have teeth on the lower track and therefore avoids manufacturing difficulties associated with such teeth.

Preferably the wrap spring is positioned free of the upper and lower tracks, and the rod is positioned in a central channel between the upper and lower tracks. In a preferred seat track assembly having first and second upper tracks which slide over corresponding first and second lower tracks, a towel bar connects levers which engage wrap springs wrapped around rods positioned between the upper and lower tracks to facilitate substantially simultaneous wrapping and unwrapping of each wrap spring around its corresponding rod.

An easy entry mechanism may be used whereby the seat back may be pivoted forward toward the seat base. A cable or the like connects the seat back to the lever so that pivoting of the seat back urges the lever to pivot down to partially unwrap the wrap spring. This permits the seat to be slid forward, allowing easy entry to the rear of a motor vehicle.

From the foregoing disclosure and the following more detailed description of various preferred embodiments, it will be apparent to those skilled in the art that the present invention provides a significant advance in the technology and art of seat track assemblies with infinite adjustment. Particularly significant in this regard is the potential the invention affords for complexity reduction, for enhanced manufacturability and reliability, and for low cost. Additional features and advantages of various preferred embodiments will be better understood in view of the detailed description provided below.

Figure 1:
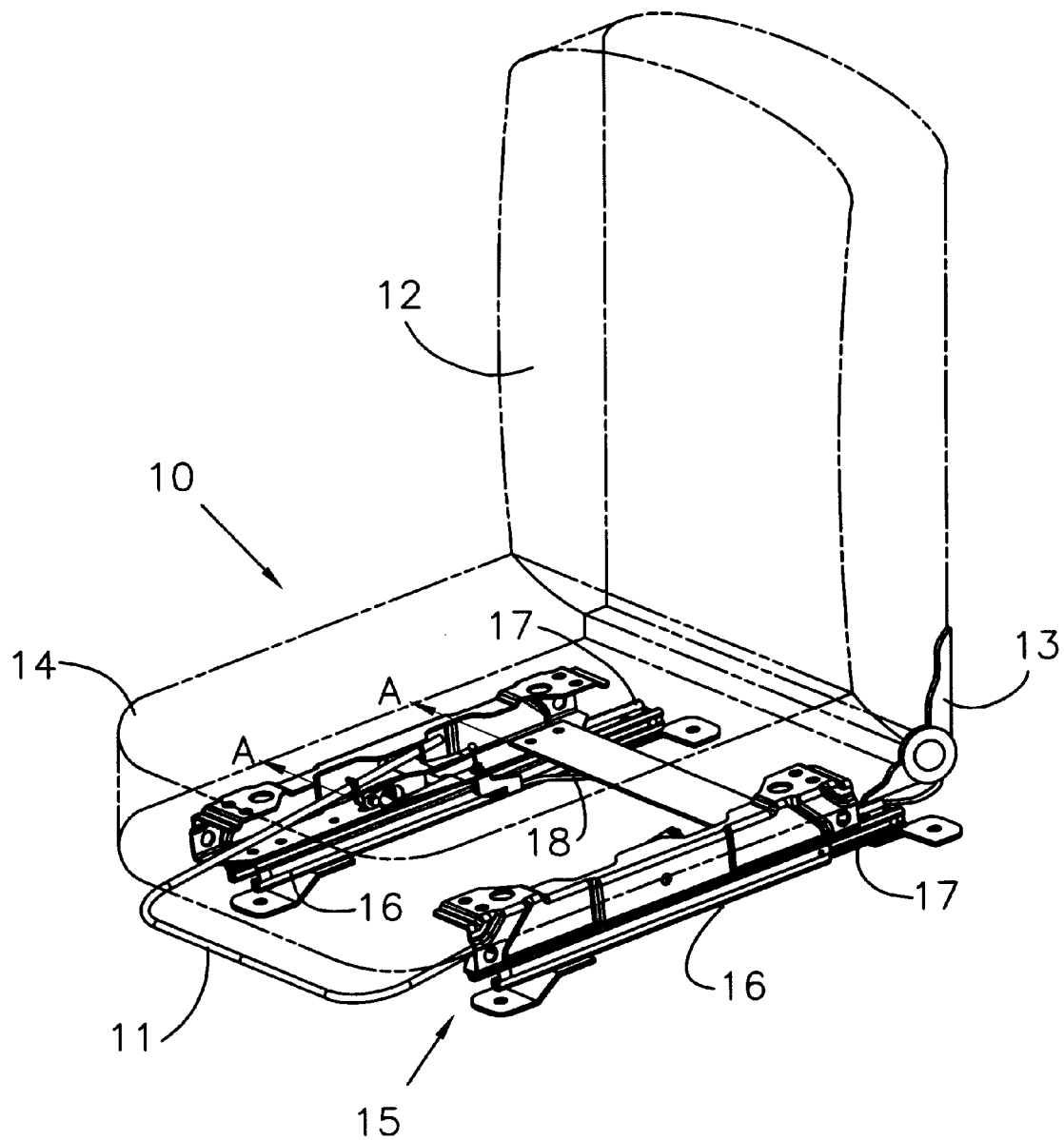
FIG. 1 is a perspective view of a motor vehicle seat having an infinitely adjustable seat track assembly in accordance with a preferred embodiment.

It should be understood that the appended drawings are not necessarily to scale, presenting a somewhat simplified representation of various preferred features illustrative of the basic principles of the invention. The specific design features of an infinitely adjustable seat track assembly as disclosed here, including, for example, the range of motion of the lever, and the specific dimensions of the attachment plate, will be determined in part by the particular intended application and use environment. Certain features of the illustrated embodiments have been enlarged or distorted relative to others to facilitate visualization and clear understanding. In particular, thin features may be thickened, for clarity of illustration. All references to direction and position, unless otherwise indicated, refer to the orientation illustrated in the drawings. In general, forward and rearward refers to the axis of the seat tracks, extending in generally left and right directions, respectively, in the plane of the paper in the side view of FIG. 3. Up, down or vertical refers to corresponding generally up and down or vertical directions in the plane of the paper in FIG. 3.

DETAILED DESCRIPTION OF CERTAIN PREFERRED EMBODIMENTS

It will be apparent to those skilled in the art, that is, to those who have knowledge or experience in this area of technology, that many design variations are possible for the infinitely adjustable seat track assembly disclosed herein. The following detailed discussion of various alternative and preferred features and embodiments will illustrate the general principles of the invention with reference to an infinitely adjustable seat track assembly used in a motor vehicle seat, particularly as a bucket seat used in the front row of a motor vehicle, although the principles of the invention will be applicable to seats used elsewhere.

Referring now to the drawings, FIG. 1 shows a preferred embodiment of a seat 10 having a seat base 14 and a seat back 12 pivotably mounted by recliner 13 to the seat base. A seat track assembly 15 is mounted to the underside of the seat base 14 for at least forward and rearward comfort adjustment of the motor vehicle seat 10. The seat track assembly 15 is seen to comprise first and second elongate lower tracks 16 and first and second elongate upper tracks 17 which can slide longitudinally over the corresponding lower tracks. Each lower track 16 in combination with a corresponding upper track 17 forms a pair of tracks, and the pairs of tracks are spaced apart to provide balance to the seat 10. A pivotable towel bar 11 connects to an infinitely adjustable latch assembly (described below) so that operation of the latch assembly associated with each pair of tracks occurs substantially simultaneously.

Figure 2:
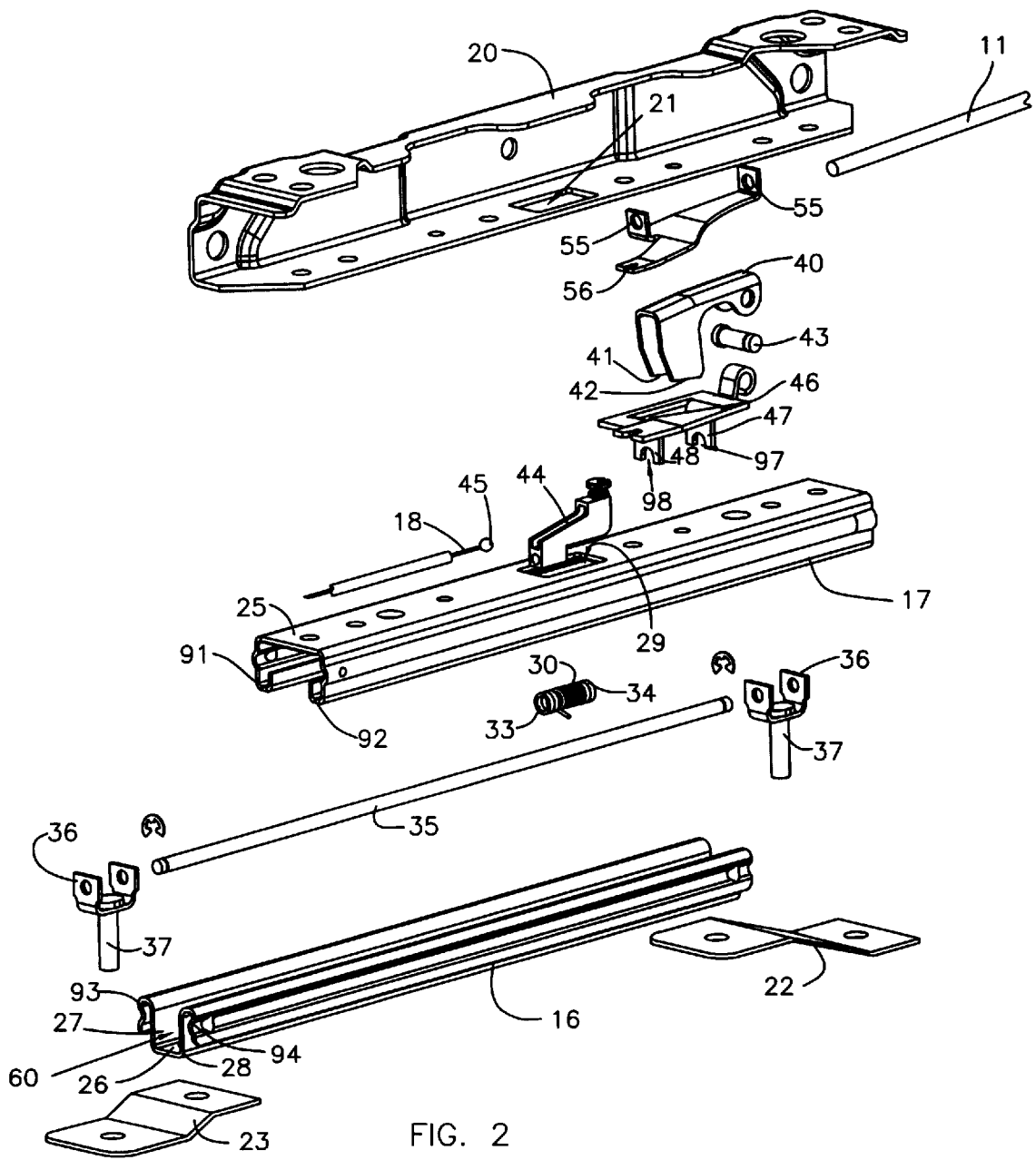
FIG. 2 is an exploded perspective view, focusing on one pair of the upper and lower tracks.

FIG. 2 shows an exploded perspective view of one upper track/lower track pair, showing the latching mechanism which releasably secures the tracks together. Lower track 16 may be mounted on front riser 22 and lower riser 23 which in turn are rigidly attached to the floor pan of a motor vehicle (not shown). Upper riser 20 is attached to the seat base 14, and upper track 17 is securely attached to the upper riser and slidably engageable with the lower track 16. In the exemplary seat tracks shown in the drawings, the upper track 17 has left and right J-hooks 91, 92 formed as unitary extensions of the upper track, extending from a top wall 25. The lower track 16 may have a bottom wall 26 and left and right side walls 27, 28 extending from the bottom wall which cooperate with the top wall to advantageously form a central channel 60. The J-hooks 91, 92, slide along corresponding downwardly extending flanges 93, 94, and cooperate with the flanges to resist vertical separation of each upper track 17 from its corresponding lower track 16. Other seat track configurations will be readily apparent to those skilled in the art given the benefit of this disclosure.

Rod 35 attaches to the lower track 16 with U-shaped brackets 36 and rivets 37. Thus, in the embodiment shown in the drawings the rod is fixed with respect to the lower track 16. A wrap spring 30 is wrapped around the rod 35. Preferably the wrap spring 30 has an internal diameter which is less than the diameter of the rod 35, so that the wrap spring wraps tightly around or bites into the rod. In this binding condition the wrap spring does not move with respect to the rod. Engagement flanges 47, 48 may be formed, for example, as part of attachment plate 46 or optionally as part of the upper riser or upper track, or some combination of these components, depending on strength requirements. In the preferred embodiment shown in the drawings the wrap spring cooperates with engagement flanges 47, 48 of attachment plate 46 to restrict forward and rearward sliding of the upper track over the lower track when the wrap spring 30 is in engagement with rod 30.

Figure 3:
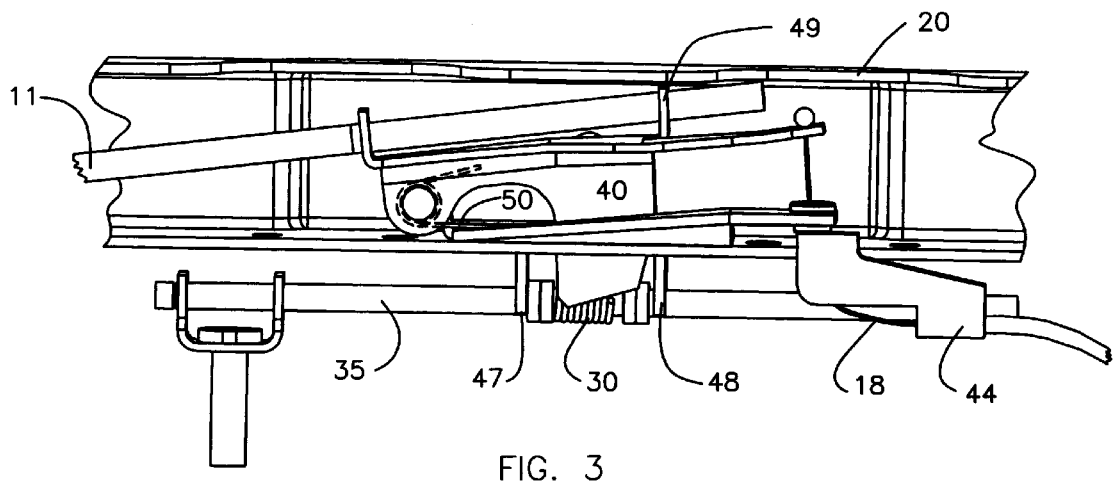
FIG. 3 is a side view of the latch assembly taken along line A—A in FIG. 1, shown in a unlatching condition, with the upper track and lower track removed for clarity of illustration.

FIG. 3 shows the wrap spring 30 in the binding condition where the upper tracks 17 are secured to the lower tracks 16. Preferably the ends 31, 32 of the wrap spring 30 are positioned free of the upper track and free of the lower track. That is, the first and second ends 31, 32 of the wrap spring are neither affixed to nor preferably in contact with the upper and lower tracks. Towel bar 11 is attached to lever 40 by openings 55 in anchor plate 56. The lever 40 is mounted to the upper riser 20 on pivot pin 43, and is pivotable from a latching position to an unlatching position. Optionally a spring 50 may be mounted to the lever 40 to bias the lever towards the unlatching position. Alternatively, the lever 40 may rest against the wrap spring 30 when in the latching position so that the wrap spring alone exerts enough biasing force on the lever to hold the lever in the latching position.

Figure 4:
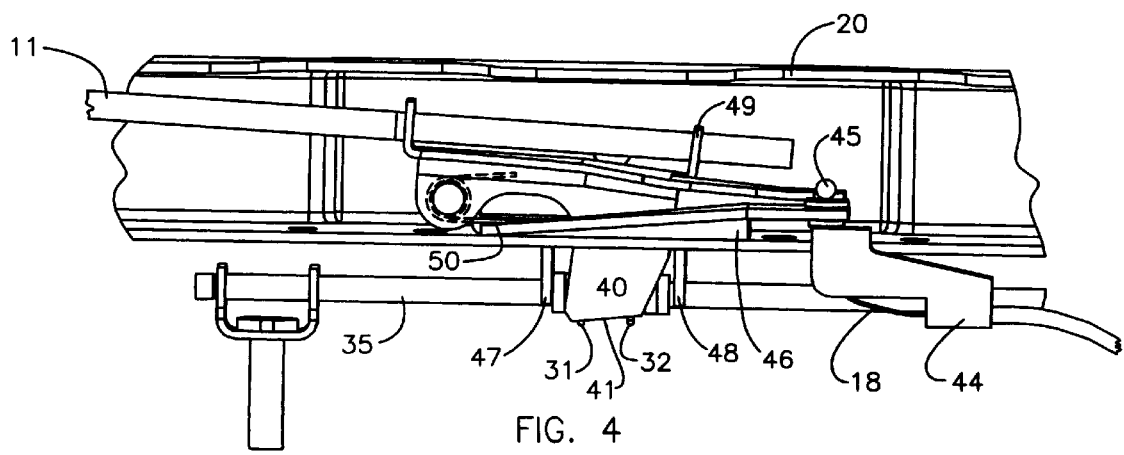
FIG. 4 is a side view of the latch assembly taken along line A—A in FIG. 1, shown in an unlatching condition, with the upper track and lower track removed for clarity of illustration.

The contact faces, 41, 42 of lever 40 extend through opening 21 in the upper riser 20 and opening 29 in the upper track 17 down to the wrap spring 30. In FIG. 4, operation of the towel bar 11 overcomes the force of the spring on the lever, urging contact faces 41,42 of the lever down against first and second ends 31,32 of wrap spring, thereby partially unwrapping the wrap spring from the rod 35. This permits the wrap spring to slide over the rod in response to a driving force provided by downwardly extending engagement flanges 47,48. Preferably each of the engagement flanges 47,48 has a corresponding semi-circular opening 97,98. These openings allow the engagement flanges to extend past the rod and enhance contact with the ends 31,32 of the wrap spring during comfort adjustment. Other attachment flanges will be readily apparent to those skilled in the art given the benefit of this disclosure. For example, openings 97,98 could be closed off as holes to receive the rod. In this way the attachment plate would be slidably secured to the rod.

Since the towel bar 11 is connected to each lever 40, spring 50 biases the towel bar as shown in the drawings. To unwrap the wrap spring so as to permit forward and rearward sliding of the upper track over the lower track, the towel bar must be pivoted. The range of motion of the towel bar 11 is necessarily limited by space constraints on the underside of the seat base 14. Advantageously, this infinite adjust mechanism provides a very compact design requiring very little in the way of motion, as the contact faces 41, 42 need move only far enough to partially unwrap the spring. Both contact faces 41, 42 cooperate to unwrap the wrap spring, providing enhanced compactness and reducing the required range of motion of the towel bar.

Optionally the seat track assembly 15 may be provided with an easy entry feature. A cable 18 with, for example, cable endball 45 may be routed through cable router 44 and attached at one end to anchor plate 56. The other end of the cable is attached to the recliner 13 so that when the seat back 12 is pivoted downward to the seat base 14 (i.e., dumped), the cable pulls on the lever 40, urging the lever into the unlatching position where the contact faces 41,42 partially unwrap the wrap spring 30. Thus, the upper tracks 17 may be slid forward with respect to the lower tracks 16 to allow entry into the rear of a motor vehicle. When the seat back is returned to the full upright position, the tension on the cable 18 is released, allowing the lever 40 to return to the latching position.

From the foregoing disclosure and detailed description of certain preferred embodiments, it will be apparent that various modifications, additions and other alternative embodiments are possible without departing from the true scope and spirit of the invention. For example, the location of the rod and the wrap spring with respect to the upper and lower tracks may be reversed and the shape of the contact faces may be modified depending on the nature of the wrap spring and the amount of cable travel. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly comprising, in combination:
   a lower track assembly comprising a lower track, a rod aligned with and directly affixed to the lower track, and a wrap spring operatively positioned around the rod and movable between a binding condition where the wrap spring wraps tightly around the rod and a condition where the wrap spring is partially unwrapped around the rod;
   an upper track assembly comprising an upper track slidable in forward and rearward directions over the lower track; and
   engagement means for cooperating with the wrap spring to restrict forward and rearward sliding of the upper track over the lower track when the wrap spring is in the binding condition, and for pushing the wrap spring along the rod in response to sliding of the upper track over the lower track when the wrap spring is partially unwrapped around the rod.

2. The seat track assembly of claim 1 further comprising a lever mounted on the upper track assembly, pivotable from a latching position where the wrap spring wraps tightly around the rod, to an unlatching position where the latch urges the wrap spring to partially unwrap around the rod.

3. The seat track assembly of claim 2 wherein a spring biases the lever toward the latching position.

4. The seat track assembly of claim 2 wherein the engagement means comprises a front flange and a rear flange, each of the flanges extending from the upper track assembly, and the wrap spring is positioned between the flanges so that when the lever is in the latching position the wrap spring restricts forward and rearward motion of the flanges relative to the lower track assembly and when the lever is in the unlatching position the wrap spring can be pushed by one of the flanges to slide longitudinally over the rod in a forward direction, and pushed by the other of the flanges to slide over the rod in a rearward direction.

5. The seat track assembly of claim 4 further comprising elastomeric bumpers, wherein each of the bumpers is positioned between the wrap spring and one of the flanges.

6. The seat track assembly of claim 4 wherein the front and rear flanges are part of an attachment plate and the lever is pivotably mounted on the attachment plate.

7. The seat track assembly of claim 2 wherein the upper track assembly further comprises an upper riser affixed to the upper track and having an opening, and the upper track has a top wall running the length of the track, the top wall having an opening aligned with opening in the upper riser to define a passage, and the lever is at least partially positioned in the passage.

8. The seat track assembly of claim 2 wherein the rod is positioned in a central opening and the lever has downwardly extending contact faces, wherein the contact faces engage first and second ends of the wrap spring.

9. The seat track assembly of claim 1 wherein the upper track has an elongate top wall, the lower track has an elongate bottom wall and left and right side walls which cooperate with the top wall to define a central channel between the tracks, and the rod is positioned in the central channel.

10. The seat track assembly of claim 9 wherein the rod is held by brackets affixed to the bottom wall of the lower track.

11. The seat track assembly of claim 1 wherein the wrap spring is positioned free of the lower track.

12. The seat track assembly of claim 11 wherein the wrap spring is positioned free of the upper track.

13. A seat track assembly mounted in a motor vehicle comprising, in combination:
    a fixed lower track assembly comprising first and second elongate lower tracks aligned generally parallel with one another, a rod affixed to and substantially aligned with each of the lower tracks, and a wrap spring having first and second ends, operatively positioned around each corresponding rod;
    an upper track assembly comprising a first elongate upper track and a second elongate upper track longitudinally slidable in forward and rearward directions over the first and second lower track, respectively;
    a lever mounted on each of the corresponding upper tracks, the lever being pivotable from a latching position wherein the wrap spring wraps tightly around the rod, restricting movement of the wrap spring with respect to the rod, to an unlatching position where the latch urges the wrap spring to partially unwrap around the rod, permitting the wrap spring to slide over the rod; and
    front and rear flanges extending from the upper track assembly, positioned around each of the wrap springs so that when the levers are in the latching position the wrap spring restricts forward and rearward sliding of the upper track assembly with respect to the lower track assembly, and when the levers are in the unlatching position, each of the wrap springs is pushed by one of the flanges to slide axially along the corresponding rod in response to sliding of the upper tracks over the lower tracks.

14. The seat track assembly of claim 13 further comprising a towel bar connecting each of the levers, wherein pivoting of the towel bar urges each of the levers to move substantially simultaneously between the latching position and unlatching position.

15. The seat track assembly of claim 13 further comprising:

an upper riser assembly affixed to the upper tracks;

a seat base attached to the upper risers;

a seat back pivotable from a full up position to a full down position;

a recliner assembly pivotably connecting the seat back to the seat base; and a lower riser assembly attached to the lower seat tracks, cooperating with the upper risers to raise and establish the angle of the seat base.

16. The seat track assembly of claim 15 further comprising a pair of cables each attached at one end to the recliner assembly;

wherein rotation of the seat back to the full-down position pulls on the cables which in turn pulls each of the levers to the unlatching position.

17. The seat track assembly of claim 13 further comprising a bracket attached to each of the levers and having attachment means for receiving a towel bar and attachment means for receiving an end of a cable.

18. The seat track assembly of claim 13 wherein each of the levers has downwardly extending contact faces which in the unlatching position engage corresponding first and second ends of the wrap spring to partially unwrap the wrap spring around the corresponding rod, permitting motion of the wrap spring with respect to the rod.

19. The seat track assembly of claim 13 wherein the front and rear downwardly extending flanges extend from an attachment plate and the lever is pivotably mounted on the attachment plate.

* * * * *